United States Patent [19]
Matthews

[11] 4,008,112
[45] Feb. 15, 1977

[54] METHOD OF MAKING AN OPTICAL WAVEGUIDE COUPLER

[75] Inventor: Michael Robert Matthews, London, England

[73] Assignee: The Post Office, London, England

[22] Filed: Aug. 4, 1975

[21] Appl. No.: 601,607

Related U.S. Application Data

[62] Division of Ser. No. 497,095, Aug. 13, 1974, abandoned.

[30] Foreign Application Priority Data

Aug. 24, 1973 United Kingdom ............ 40221/73

[52] U.S. Cl. ................................ 156/644; 156/635; 156/663; 252/79.3
[51] Int. Cl.² ................... C03C 15/00; C03C 25/06
[58] Field of Search ................. 156/7, 15, 25, 158; 65/31; 252/79.2, 79.3; 350/96 R, 96 WG

[56] References Cited

UNITED STATES PATENTS

| | | | |
|---|---|---|---|
| 2,398,708 | 4/1946 | Hendrix | 156/24 X |
| 2,717,203 | 9/1955 | VanLaar | 156/25 X |

*Primary Examiner*—William A. Powell
*Attorney, Agent, or Firm*—Kemon, Palmer & Estabrook

[57] ABSTRACT

A dielectric optical waveguide coupler for optically coupling together two lengths of dielectric optical waveguide consists of a tube having a capillary bore, into which may be inserted, from each end of the tube, the two dielectric optical waveguides to be joined. The capillary bore is tapered at each end to facilitate the insertion of the dielectric optical waveguides. The dielectric optical waveguide coupler may be made by immersing a capillary bore tube with its capillary bore filled with water into an etchant solution.

5 Claims, 2 Drawing Figures

METHOD OF MAKING AN OPTICAL WAVEGUIDE COUPLER

This is a division, of application serial no. 497,095 filed August 13, 1974, now abandoned.

The present invention relates to a coupler for dielectrical optical waveguides and a method of making such a coupler.

The terms "light" and "optical" has herein used are to be interpreted as covering those regions of the electromagnetic spectrum more usually designated as the "infra-red", "visible", and "ultra-violet".

The term "optical fibre" is to be given the same meaning as "dielectric optical waveguide".

The ideal jointing technique for optical fibres should meet the following requirements:

A. The joint produced should have a high transmission efficiency,
B. no great skill should be required to make the joint,
C. the joint should be inexpensive,
D. the joint should be adaptable for making simultaneous connections between a large number of optical fibres, as in a cable.

Many prior art devices fail to meet one or more of the above requirements. Two examples of prior art techniques will be briefly mentioned. The first technique consists of butting the ends of the two optical fibres to be joined, and fusing the ends together. This technique entails the use of elaborate positioning apparatus to enable the optical fibre to be correctly positioned prior to fusing. This requires considerable operator skill and the use of complex and expensive equipment. The second technique consists of positioning the optical fibres to be joined in a groove in a plate, sliding the ends together, positioning a second plate on top of the fibres and clamping the plates together. This technique is difficult to adapt to handle a large number of fibres simultaneously and in addition involves the use of clamps.

The invention consists of a capillary bore tube, into which may be inserted, from each end of the tube, two dielectric optical waveguides to be joined. The capillary bore is tapered at each end to facilitate the insertion of the dielectric optical waveguides. The dielectric optical waveguides are pushed into the capillary bore until their ends butt. The capillary bore may be filled with a refractive index matching fluid to enhance the transmission efficiency of the coupling.

According to a first aspect of the present invention there is provided a dielectric optical waveguide coupler for optically connecting first and second lengths of dielectric optical waveguide having a core and a cladding, said dielectric optical waveguide coupler comprising a sleeve defining a guideway arranged to retain the cores of said first and second lengths of dielectric optical waveguide in register, said guideway having a central section and two end sections, said central section having a substantially constant cross sectional area, said end sections having a cross-sectional area varying smoothly in an axial direction, between outer faces of said sleeve and said central section, from a cross-sectional area greater than said substantially constant cross-sectional area, at said outer faces, to said substantially cross-sectional area.

According to a second aspect of the present invention there is provided a method of making a dielectric optical waveguide coupler as defined in the preceding paragraph comprising immersing a tube having a capillary bore filled with a liquid in an etchant miscible with the liquid.

An embodiment of the invention will now be described by way of example with reference to the accompanying drawings in which.

A pair of dielectric optical waveguides are coupled together, according to the invention, by forming a high efficiency butt joint inside a narrow bore glass capillary tube having a bore diameter which is a few microns larger than the diameter of the fibres to be joined.

In order to facilitate the threading of the fibres into the capillary tube it is necessary to taper out the bore at the ends of the tube. This may be done by either of the following methods:

1. Etching: the capillary tube is filled with water and immersed in an etching solution consisting of 80% hydrofluoric acid and 20% sulphuric acid. The water prevents the etching solution being drawn into the tube by capillary action. After 10 to 15 minutes in the solution the tube is found to have well defined tapers at each end.

2. Blowing: large tapers are easily formed using a glass blowing technique. The sealed end of a capillary tube is heated and a bubble blown using compressed air. On cutting through the bubble the tube is left with a smoothly tapered end. A taper is formed at the other end of the tube in a similar manner.

Figure 1:
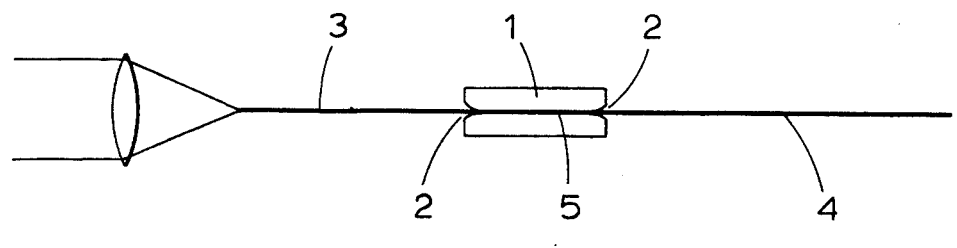
FIG. 1 illustrates diagrammatically part of an optical communications system employing a coupling according to the invention.

Referring now to the drawings, and FIG. 1 in particular, a sleeve or tube 1 having a capillary bore 5, which acts as a guideway, with tapers 2 formed at each end of the capillary bore, is filled with an immersion oil, and the dielectric optical waveguides 3 and 4 are inserted into the capillary bore 5 from both ends. The dielectric optical waveguides are pushed in until the ends abutt against each other. The capillary bore holds the ends of the dielectric optical waveguides so that the cores are in register, i.e. so that the cross-sectional areas of the two cores are substantially lined up with each other. The immersion oil reduces the refractive index mismatch at the ends of the two fibres, and increases the optical efficiency of the coupling.

The ends of the dielectric optical waveguides are prepared by the "scratch and pull" method, in which the optical fibre is scored by a hard material, e.g. diamond and then pulled until it breaks. Such breaks are clean and substantially at right angles to the fibre axis. The quality of the resulting end faces of the dielectric optical waveguides can be assessed from the symmetry of the radiation pattern when projected onto a screen.

For multi-mode dielectric optical waveguides having an outside diameter of 100 microns, and a dielectric optical waveguide coupler with a capillary bore diameter of 110 microns, optical efficiencies for the coupling, defined by the ratio of input to output power, in the range of 87% − 95% having been obtained. For multimode dielectric optical waveguides having an outside diameter of 102 microns and a dielectric optical waveguide coupler with a capillary bore diameter of 120 microns, optical efficiencies in the range 90% − 94% have been obtained.

When forming a coupling, care is necessary to avoid contamination in the index matching oil and the formation of air bubbles in the index matching oil, since these effects can cause a serious loss of optical efficiency.

Figure 2:
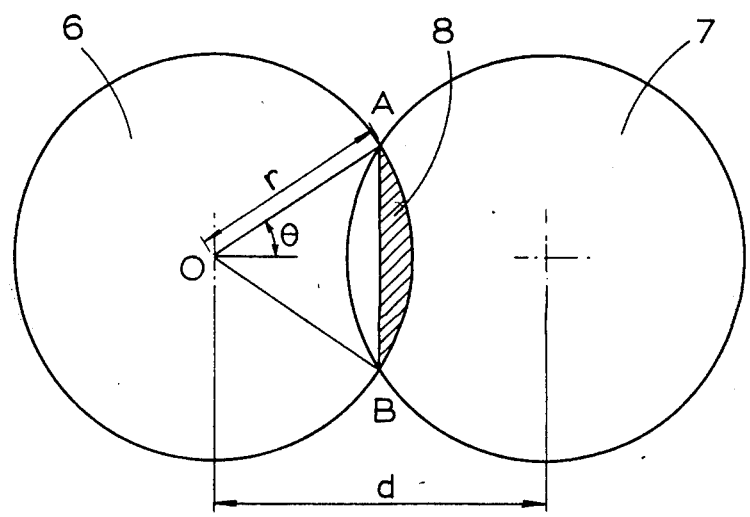
FIG. 2 shows the region of overlap between two dielectric optical waveguides in a dielectric optical waveguide coupler according to the invention.

The jointing efficiency of a coupling is to a large degree determined by the extent within which the dielectric optical waveguide cores are held in register. A theoretical estimate of the jointing efficiency can be obtained by considering the percentage overlap of the two fiber cores, 6 and 7, see FIG. 2.

$$\text{Area of triangle OAB} = \frac{d}{2}\left[r^2 - \frac{d^2}{4}\right]^{1/2}$$

$$\text{Area of sector OAB} = \pi r^2 \frac{\sigma}{180} = \pi r^2 \cos^{-1}\left(\frac{d}{2r}\right)/180$$

$$\text{Area of shaded area } 8 = \pi r^2 \cos^{-1}\left(\frac{d}{2r}\right)/180 - \frac{d}{2}\left[r^2 - \frac{d^2}{4}\right]^{1/2}$$

$$\% \text{ overlap} = 2\left[\cos^{-1}\left(\frac{d}{2r}\right)/180 - \frac{d}{2\pi r^2}\left[r^2 - \frac{d^2}{4}\right]^{1/2}\right] \times 100$$

Therefore the expression for the optical efficiency of the coupling is:

$$\text{Efficiency} = 2\left[\cos^{-1}\left(\frac{d}{2r}\right)/180 - \frac{d}{2\pi r^2}\left(r^2 - \frac{d^2}{4}\right)^{1/2}\right] \times 100\%$$

Where $r$ is the radius of the fibre core and $d$ is a measure of the misalignment of the two dielectric optical waveguides. No account is taken of any refractive index mismatch at the fibre end. Applying the above expression to the two cases referred to previously yields the following results:

1. Outside diameter of dielectric optical waveguide 102 microns, core diameter of dielectric optical waveguide 97 microns, capillary bore diameter 110 microns, theoretical jointing efficiency 89%.

2. Outside diameter of dielectric optical waveguide 102 microns, core diameter of dielectric optical waveguide 97 microns, capillary bore diameter 120 microns, theoretical jointing efficiency 76%.

Both theoretical estimates are low compared with the corresponding measured efficiencies. The theoretical estimates are the minimum jointing efficiencies to be expected in each case, neglecting effects other than misalignment. It therefore seems that some self alignment of the dielectric waveguides occurs within the capillary tube. This is most likely the result of some surface tension effect due to the presence of index matching oil.

The technique described above for coupling together a pair of dielectric optical waveguides appears to have the potential of producing high efficiency joints between multimode dielectric optical waveguides without the use of sophisticated alignment techniques.

What we claim is:

1. A method of making a dielectric optical waveguide coupler in the form of a hollow tube, with a bore which tapers inwardly from at least one end toward a central capillary sized bore, the steps comprising:
   (1). Providing a dielectric tube having a capillary bore extending out of at least one end of said tube, with a liquid filling said bore;
   (2). Immersing at least one end of said tube in an etchant for said tube, said etchant being miscible in said liquid.

2. A method as claimed in claim 1 wherein the liquid is water.

3. A method as claimed in claim 2 wherein the dielectric optical waveguide coupler is glass and the etchant contains hydrofluoric acid.

4. A method as claimed in claim 3 wherein the etchant contains sulphuric acid.

5. A method as claimed in claim 4 wherein the etchant includes 80% hydrofluoric acid and 20% sulphuric acid.

* * * * *